Aug. 23, 1960　　　H. F. COX, JR　　　2,949,774
MASS FLOW METER

Filed March 8, 1956　　　　　　　　　2 Sheets-Sheet 1

INVENTOR.
HERBERT F. COX, JR.
BY
ATTORNEY

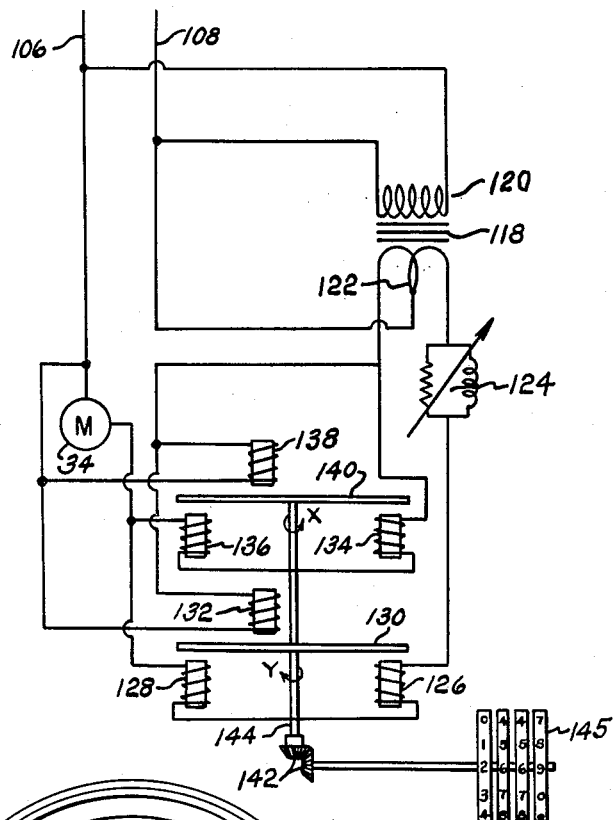
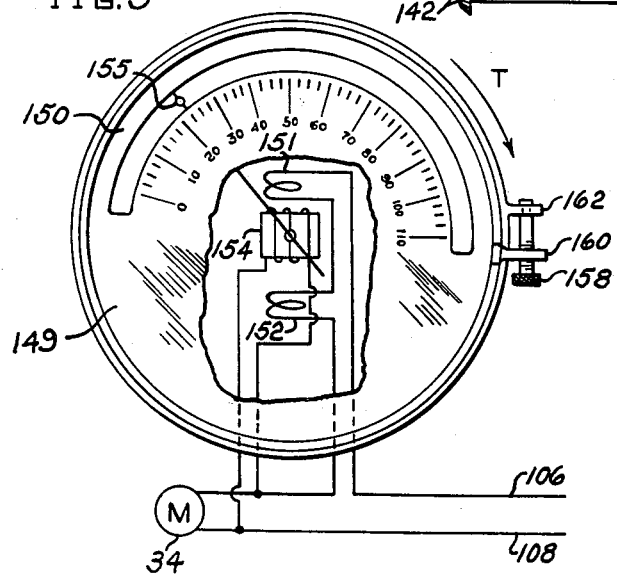

United States Patent Office 2,949,774
Patented Aug. 23, 1960

2,949,774

MASS FLOW METER

Herbert F. Cox, Jr., 406 Sedgwick Drive, Syracuse, N.Y.

Filed Mar. 8, 1956, Ser. No. 570,297

2 Claims. (Cl. 73—194)

This invention relates to mass flow measuring apparatus, and more particularly to an apparatus employing rotary acceleration, as the basis for measurement.

It has long been recognized that the continuous measurement of some liquids by volumetric or displacement methods is subject to error sufficiently great as to render such methods unacceptable. Many liquids, or liquid mixtures may vary considerably in the weight per unit of volume, or specific gravity. Where the actual weight per unit volume, or actual mass is the measurement that is desired, such volumetric meters can only be employed if the weight per volume is constant. Some liquids contain gases in widely varying degree. Milk, due to its inherent foaming characteristic, may include large amounts of air. In addition, the percentage of butter fat of lesser specific gravity cannot be indicated by volumetric continuous measuring methods. In fact, any solution containing solids in varying amounts cannot be measured volumetrically to determine the value of the liquid without determining the specific gravity of the solids bearing liquid, and modifying the volumetric measure thereby. Further, should such specific gravity of the liquid be subject to change, volumetric measure cannot be used.

In the dairy industry, apparatus employed for measurement of the weight of milk should satisfy the sanitation standards set for the industry by governmental agencies, whereby to protect against contamination.

It is an object of the present invention to provide a continuous mass measurement apparatus for liquids.

It is a further object of the invention to provide an apparatus of the character set forth which will be relatively simple in construction, and which may be readily subjected to inspection for sanitation purposes, and which can easily be maintained sanitary.

It is a further object of the invention to provide direct electrical means for measuring the mass flow rate or total mass.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 2 is an electrical circuit diagram for measuring total mass flow;

Figure 3 is an electrical circuit diagram for measuring the mass flow rate; and

Figure 1:
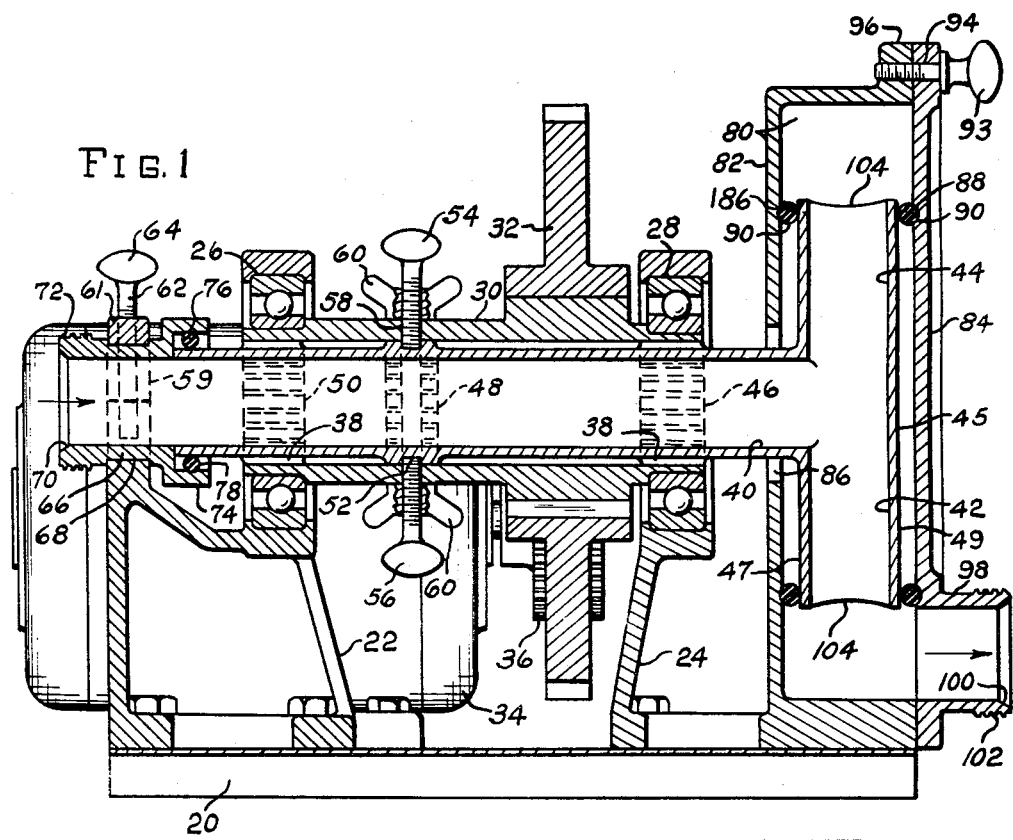
Figure 1 is a diagrammatic longitudinal sectional view through the mass measurement apparatus.

Referring to the drawings and particularly Figure 1, there is shown a rigid frame 20 having spaced split bearing supports 22 and 24 in which are positioned ball bearings 26 and 28 adapted to resist endwise thrust. Journalled in and between the bearings is a shouldered sleeve 30 provided with a gear 32 driven by a constant speed motor such as a synchronous motor 34, the motor having a pinion 36 engaging the gear 32. The sleeve 30 is internally splined as at 38 to receive a removable tube 40 which has at its outlet end a pair of opposed radial branch accelerating tubes or conduits 42 and 44. The axial portion of the tube is provided with external splined shoulders 46, 48 and 50, 46 and 50 of which are adapted to engage internal splines 38 of the sleeve 30. The splined shoulder 48 on the tube 40 is provided with an annular groove 52 which is adapted to receive the ends of locking hand set screws 54 and 56 which extend through radial threaded apertures 58 in the sleeve 30. End thrust of the tube 40 is thus transmitted to the sleeve 30. Locking wing nuts 60 are provided to secure the set screws against loosening.

The bearing support member 22 is provided with a clamp ring 59 in axial alignment with the tube 40 and such clamp ring has a removable top half 61 which is held in position by shouldered screws 62 which are threaded into the bottom half of the clamp ring. The shouldered screws are provided with oval handle extensions 64 so as to provide ready means to open the clamp as desired. The clamp is adapted to hold a fitting 66 which is provided with an annular groove 68 adapted to snugly receive the clamp ring 59. The fitting has a bevelled conical seat 70 at one end for rceiving a connecting pipe and is suitably threaded as at 72 to receive a connecting pipe flanged coupling member. The other end of the fitting is provided with an annular outward offset 74 forming a recess which is adapted to telescope over the end of the tube 40. The internal annular surface of the recess is provided with a groove 76 to receive an O ring seal 78 which engages as a running seal with the outer surface of the tube 40.

Figure 4:
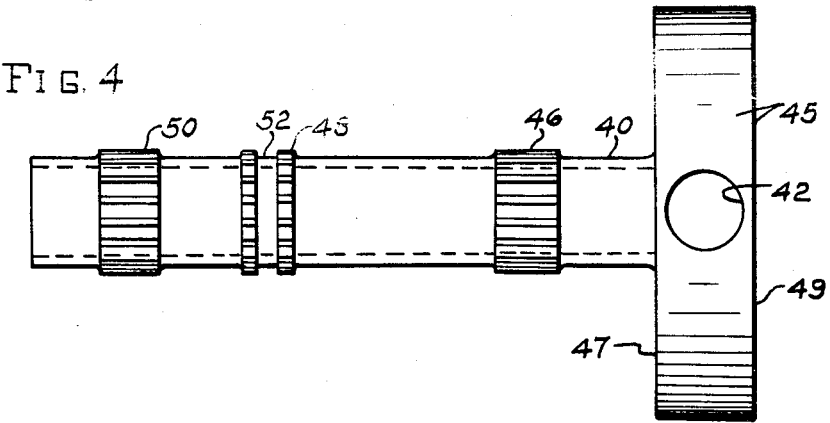
Figure 4 is an elevational view of the tubular shaft and acceleration branch conduits.

The outlet end of the tube 40 and particularly the radial branch conduits 42 and 44 are provided with a housing 80 mounted on the frame 20, which housing comprises an annular casing 82 and a cover plate 84. The housing is provided with an aperture 86 surrounding the tube 40. The conduits are formed in a circular disc head 45 shown as integral with the tube 40, such head having planar end faces 47 and 49 (see Figure 4). The inside walls of the housing and cover plate are provided with annular grooves 186 and 88 in which are positioned O rings 90 of rubber like material, which bear on the surfaces 47 and 49 to provide running seals. The cover plate 84 is secured to the casing by a plurality of hand screws such as 93, which extend through a plurality of holes 94 located adjacent the outer edge of the cover plate and such screws are threaded into the flange 96 of the casing member 82. The cover plate is provided at the lowermost point with an integral tubular outlet 98 which is provided with a conical seat 100 and threads 102 to receive a flanged coupling to effect the attachment of a connecting pipe or hose.

As liquid flows through the tube 40 and into the branch tubes 42 and 44, while the tube is rotating, such liquid will be accelerated in moving from the rotational axis of the tube to the outer open ends 104 of the branch tubes 42 and 44. The torque of the motor 34 required to drive the tube 40, assuming a constant speed is maintained, will be in direct proportion to the mass of the liquid flowing through the tube 40 and accelerated in the radial branch tubes 42 and 44. Such liquid upon being discharged from the ends of the branch tubes 42 and 44 will be collected by the chamber formed by the housing 80 and discharged through the outlet 98.

In order to measure the mass flowing through the pipe and accelerated in the radial branch tubes by reason of the rotation of the tube 40, a watt hour meter is employed to measure the power in watt hours consumed by the motor. Such watt hour meter, if connected directly in the power supply to the synchronous motor 34 would be in error in measuring the force necessary to accelerate the liquid by an amount equal to the power required to rotate the motor armature and the tube 40 in its bearings and seals, when there is no flow through the tube 40.

In Figure 2 there is shown a circuit for measuring the power in watt hours consumed over and above the no load power or tare load of the synchronous motor which tare load includes the gearing, windage, electrical losses and bearing and seal friction losses, so that the actual mass accelerated may be directly measured. Such circuit comprises an induction type watt hour meter of the type employed for poly-phase power measurement. Such meter comprises current coils 126 and 128, and a voltage coil 132 acting on a conductor disc rotor 130, and current coils 134 and 136, and voltage coil 138 acting on a second disc rotor 140. Both discs are fixed to a common shaft 144 and adapted to drive through gearing 142, an indicator 145.

The motor 34 is connected to one side 106 of the line directly, and to the other side 108 through a divided circuit, the branches of which include the current coils 126 and 128, and 134 and 136 respectively. Such branches are connected to the terminals of a low voltage secondary of a transformer 118, the primary 120 of which is connected across the line leads 106 and 108. The secondary has a center tap 122, which is connected to the line 108. The branch circuit including the current coils 126 and 128 includes an impendance 124 which may be adjusted so as to cause the motor current flowing through the branch circuits, to divide unequally in a fixed ratio.

The connections to the meter coils is such that the secondary induced current flowing in coils 126 and 128 tends to rotate the disc 130 in the direction Y, whereas the portion of the secondary induced current flowing in coils 134 and 136 tends to rotate the disc 140 in the direction X. It will be understood that the current in the secondary of the transformer 118 will be approximately 180° out of phase with the voltage of the lines 106 and 108 and across the primary 120. Current induced in the secondary 122 flows through the coils 126, 128, 136 and 134 in series and strengthens the motor current in coils 126 and 128, and opposes the motor current in coils 134 and 136. By adjusting the impedance 124 so that the motor current flowing in coils 134 and 136 is increased by the amount of secondary current from the transformer 118, and the motor current flowing in coils 126 and 128 is correspondingly decreased by the amount of secondary current, it will be seen that the effective current in coils 134 and 136 will equal the effective current in coils 126 and 128, and the torques on the discs 130 and 140 will be equal and opposite, resulting in no rotation of the discs. Such an adjustment of the impedance will be effected when the motor is operating under its tare load alone, the proper adjustment being determined by the non-rotation of the meter discs, or indicator 145.

If a load is applied to the motor, as a result of accelerating liquid in the branch tubes, the motor current in both branches of the watt hour meter will increase, but such motor current components will be divided in the same ratio as when the motor was operating under no load conditions. Thus the current in coils 134 and 136 will increase, the effective current being the result of such motor current less the secondary induced current which latter remains constant. Similarly, the motor current in coils 126 and 128 will increase, and the effective current will be the sum of such current plus the secondary current. Such current produces a torque in the reverse direction to that of the current in coils 134 and 136, but since the motor current in coils 126 and 128 increases at a lesser rate than the motor current in coils 136 and 134, the torque resulting from coils 134 and 136 will exceed the torque from coils 126 and 128 and thus cause rotation of the discs 130 and 140 and indicator 145.

The following table of meter disc torque producing current values using round numbers will serve to illustrate the net result, assuming the impedance to be adjusted to divide the current in the ratio of 3:1, and with the no load current assumed as 4 amperes and the transformer secondary current assumed as 1 ampere. With such adjustment of the impedance, no rotation of the meter is had under no load.

In such table $I_l$ represents total motor load current, including no load current, which no load current is assumed as 4 amperes, and $I_n$ represents the net current over and above the no load current due to the motor accelerating liquid in the branch tubes. $I_{m1}$ represents the motor current flowing in the coils 134 and 136, while $I_{m2}$ represents the motor current flowing in the coils 126 and 128. $I_s$ represents the transformer secondary current. $I_{T1}$, represents $I_{m1}$ minus $I_s$, or the net difference current effective to produce torque in the direction X, and $I_{T2}$ represents $I_{m2}$ plus $I_s$, or the net summation current effective to produce torque in the opposite direction or direction Y. $I_{T1}-I_{T2}$ represents the net difference torque produced by the currents effective to rotate the discs.

| $I_l$ | $I_n$ | $I_{m1}$ | $I_s$ | $I_{T1}$ | $I_{m2}$ | $I_s$ | $I_{T2}$ | $I_{T1}-I_{T2}$ |
|---|---|---|---|---|---|---|---|---|
| 4  | 0  | 3  | 1 | 2  | 1 | 1 | 2 | 0 |
| 8  | 4  | 6  | 1 | 5  | 2 | 1 | 3 | 2 |
| 12 | 8  | 9  | 1 | 8  | 3 | 1 | 4 | 4 |
| 16 | 12 | 12 | 1 | 11 | 4 | 1 | 5 | 6 |

It will be seen from the illustrative table that the torque producing current ($I_{T1}-I_{T2}$) increases directly proportional to the current $I_n$, so that the meter torque is a proportional measure of the actual mass accelerating load current. It will be understood that the discs of such meter will be provided with the usual magnetic rotation damping brake, and such other compensating coils as are well understood in the art, and that the meter will rotate at a rate proportional to the watts consumed to accelerate the mass, which is the product of volts times the in phase amperes.

It will be seen that the net effective torque producing current is one-half of the net load current for the values assumed, so that the meter does not indicate actual watts, or actual watt hours, but a watt hour value proportional thereto. By selecting a suitable gearing ration at 142, the indicator discs may be caused to read actual watt hours, or actual pounds of liquid accelerated or any other mass quantity desired.

The watt hour meter will thus drive the counter 145 which will give a direct reading proportionately to the weight of liquid accelerated by the rotation of the branched tube 40.

In Figure 3, there is shown a circuit for indicating rate of mass flow, using a watt meter 149 having current coils 151 and 152, and voltage coil 154. The current coils are in series with the line 106, and the voltage coil is connected across the lines 106 and 108 supplying motor 34. By employing a meter having uniform scale increments and characteristics, and by rotating the dial 150 relative to the indicator 155, the dial can be adjusted to show zero watts while the motor is operating under tare load only. Any adjustment, such as the thumb screw 158 interconnecting the lugs 160 and 162 on the meter frame and dial respectively, may be used to effect such zero adjustment for tare load current. While the meter may indicate watts, it will also be seen that the meter may indicate pounds of milk per hour, or any other measure of weight per unit of time.

It will be seen from a consideration of the mechanical structural design that the parts are relatively few and provided with exterior and interior surfaces which may be readily cleaned and maintained sanitary as is highly desirable in mass measuring apparatus to be used for measuring the weight of milk. It will also be seen that tube 40 is readily removable from the apparatus by removing the cover plate 84 and loosening the set screws 54. Thus the tube may be readily inspected for cleanliness and cleaned with little difficulty and the chamber formed by the casing 82 and the cover plate 84 may likewise be readily inspected and cleaned. Since the only parts subjected to contact with the fluid are essentially the tube 40 and the casing 82 and cover plate 84, it will be seen that the apparatus is one that would be readily adaptable to usage in conjunction with milk measurement where cleanliness is an essential.

It will further be seen that in the practical use of the apparatus, as for example in measuring milk which might contain large proportions of entrained air, the apparatus will measure the total mass of the milk, and the air being of negligible weight in comparison to the milk will not introduce an error of any serious consequence.

While the accelerating means disclosed in Figure 1 is shown as comprising opposed radial tubes, which balance one another, it will be appreciated by those skilled in the art that such tubes could extend at an angle, or that a closed vane impeller would be equally effective. The essential feature of the apparatus is to provide a means for moving liquid from the axis through a certain radius, whereby rotation effects acceleration, the force of which is measurable to provide a true indication of the mass accelerated.

While a single form of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A mass flow measuring device comprising a frame, a pair of aligned bearings in said frame, an axial conduit journalled in said frame, a constant speed motor mounted on the frame including gearing adapted to rotate said conduit on its axis, a stationary nipple disposed at one end of said conduit having a running seal in engagement with the conduit end, a radial connecting conduit on the other end of said conduit for accelerating liquid flowing through said axial conduit into said radial conduit, a stationary housing enclosing the path of rotation of said radial conduit, having a running seal with said radical conduit, said housing having an outlet nipple, and means for measuring the difference between the total watt hours consumed by said motor and the no load watt hours consumed by said motor.

2. A mass flow meter comprising in combination, rotatable means for accelerating the particles of the fluid to be measured comprising flow conducting means for confining and directing into the accelerating means the entire flow of fluid to be measured for acceleration of all the fluid particles of the flow by the accelerating means, a constant speed motor for driving said rotatable means, an electrical circuit for measuring the energy used by said motor for accelerating the particles, comprising a source of current supply, a polyphase watt hour meter having an indicator, and separate sets of current and voltage coils acting on separate rotor discs respectively to drive said indicator from the differential torque thereof, a transformer having its primary connected to said source of supply, and a low voltage secondary having a midtap connected to one side of said source, branch circuits connecting the opposite terminals of said secondary through the current coils of the respective sets in series and to one side of said motor in parallel, a connection from said motor to the other side of said supply, said voltage coils being connected across said source, and a variable impedance in one of said branches to proportionally divide the motor current flowing in said branches unequally, said current and voltage coils of one set being connected to exert a torque on one rotor disc in a direction opposite to the torque exerted on the other rotor disc by the current and voltage coils of the other set in respect to the divided motor current flowing through said branches, and in the same direction in respect to the secondary current flowing in series through said current coils, whereby said impedance can be adjusted at no load to equalize the opposing torques and to eliminate energy indication resulting from motor and rotatable means tare.

References Cited in the file of this patent

UNITED STATES PATENTS

| | | |
|---|---|---|
| 1,942,193 | Szilas | June 2, 1933 |
| 2,323,166 | Urfer | June 29, 1943 |
| 2,646,547 | Gregg | July 21, 1953 |
| 2,714,310 | Jennings | Aug. 2, 1955 |
| 2,758,830 | Bentley | Aug. 14, 1956 |
| 2,775,125 | Peaceman | Dec. 25, 1956 |

FOREIGN PATENTS

| | | |
|---|---|---|
| 734,992 | Great Britain | Aug. 10, 1955 |
| 740,037 | Great Britain | Nov. 9, 1955 |

OTHER REFERENCES

"A Fast-Response True-Mass-Rate Flowmeter" by Li and Lee, pages 835–841, July 1953, ASME Transactions.